US012663584B2

(12) United States Patent
Lin et al.

(10) Patent No.: US 12,663,584 B2
(45) Date of Patent: Jun. 23, 2026

(54) STRUCTURES INCLUDING A PHOTONIC DEVICE AND AN UNDERCUT

(71) Applicant: GlobalFoundries U.S. Inc., Malta, NY (US)

(72) Inventors: Yarong Lin, Flushing, NY (US); Thomas Houghton, Marlboro, NY (US); Teck Jung Tang, Ballston Lake, NY (US); Mini Modh Ghosal, Maharashtra (IN); Arunraj Prakash, Karnataka (IN)

(73) Assignee: GlobalFoundries U.S. Inc., Malta, NY (US)

( * ) Notice: Subject to any disclaimer, the term of this patent is extended or adjusted under 35 U.S.C. 154(b) by 313 days.

(21) Appl. No.: 18/623,146

(22) Filed: Apr. 1, 2024

(65) Prior Publication Data

US 2025/0306274 A1      Oct. 2, 2025

(51) Int. Cl.
*G02B 6/122*        (2006.01)
*G02B 6/136*        (2006.01)

(52) U.S. Cl.
CPC ........... *G02B 6/1228* (2013.01); *G02B 6/136* (2013.01)

(58) Field of Classification Search
CPC ......... G02B 6/1228; G02B 6/305; G02B 6/42
See application file for complete search history.

(56) References Cited

U.S. PATENT DOCUMENTS

| | | |
|---|---|---|
| 11,156,775 B2 | 10/2021 | Saado |
| 11,550,101 B2 | 1/2023 | Saado |
| 11,740,412 B2 * | 8/2023 | Lin .................. G02B 6/305 385/43 |
| 11,860,414 B2 | 1/2024 | Barwicz et al. |
| 2023/0128786 A1 | 4/2023 | Sporer et al. |

FOREIGN PATENT DOCUMENTS

| | | |
|---|---|---|
| TW | 201513323 A | 4/2015 |
| TW | 201838162 A | 10/2018 |

OTHER PUBLICATIONS

Taiwan Intellectual Property Office, Examination Report issued in Taiwanese Patent Application No. 114107402 on Jan. 23, 2026; 30 pages.
European Patent Office, Extended European Search Report and Opinion issued in European Patent Application No. 24203772.9 on Mar. 13, 2025; 13 pages.

(Continued)

*Primary Examiner* — Chad H Smith
(74) *Attorney, Agent, or Firm* — Thompson Hine LLP; Anthony Canale

(57) ABSTRACT
Structures including a photonic device, such as a spot-size converter, and an undercut, and related methods. The structure comprises a photonic device, a semiconductor substrate, and a dielectric layer disposed between the photonic device and the semiconductor substrate. The dielectric layer includes a plurality of D-shaped openings that are laterally offset from the photonic device, and each of the plurality of D-shaped openings has a first sidewall portion that is curved and a second sidewall portion that is substantially planar.

20 Claims, 11 Drawing Sheets

(56)           References Cited

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th31.4.

Taiwan Intellectual Property Office, Rejection Decision issued in Taiwanese Patent Application No. 114107402 on May 4, 2026; 20 pages.

* cited by examiner

STRUCTURES INCLUDING A PHOTONIC DEVICE AND AN UNDERCUT

BACKGROUND

The disclosure relates to photonic chips and, more specifically, to structures including a photonic device, such as a spot-size converter, and an undercut, and related methods.

Photonic chips are used in many applications and systems including, but not limited to, data communication systems and data computation systems. A photonic chip includes a photonic integrated circuit comprised of photonic devices, such as modulators, polarizers, and optical couplers, that are used to manipulate light received from a light source, such as a laser or an optical fiber.

A spot-size converter is a type of photonic device that is commonly used for coupling light of a given mode from the light source to the photonic integrated circuit. The spot-size converter may include a section of a waveguide core that defines an inverse taper having a tip. The narrow end of the inverse taper at the tip is positioned adjacent to the light source. The wide end of the inverse taper is connected to another section of the waveguide core that guides and routes the light to the photonic integrated circuit.

The gradual variation in the cross-sectional area of the inverse taper supports mode transformation and mode size variation associated with mode conversion when light is transferred from the light source to the spot-size converter. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width dimension increases, the inverse taper can eventually support the entire incident mode and confine the electromagnetic field.

An undercut may be formed by lithography and etching processes in the semiconductor substrate beneath the spot-size converter. The undercut may function to reduce light loss from the spot-size converter to the underlying semiconductor substrate. A groove may be formed by lithography and etching processes contiguous with the undercut. The groove may be used for mounting a light source at a position adjacent to the spot-size converter. For example, groove may be used to self-align and support the end of an optical fiber at a location adjacent to the tip of the inverse taper. However, the yield for successfully forming the groove and the properties of the undercut can be limited by the characteristics of the patterned openings used to initiate the performance of the associated etching process.

Improved structures including a photonic device, such as a spot-size converter, and an undercut, as well as related methods, are needed.

SUMMARY

In an embodiment of the invention, a structure comprises a photonic device, a semiconductor substrate, and a dielectric layer disposed between the photonic device and the semiconductor substrate. The dielectric layer includes a plurality of D-shaped openings that are laterally offset from the photonic device. Each of the plurality of D-shaped openings has a first sidewall portion that is curved and a second sidewall portion that is substantially planar.

In an embodiment of the invention, a method comprises forming a photonic device and forming a plurality of D-shaped openings in the dielectric layer that are laterally offset from the photonic device. A dielectric layer is disposed between the photonic device and a semiconductor substrate. Each of the plurality of D-shaped openings has a first sidewall portion that is curved and a second sidewall portion that is substantially planar.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
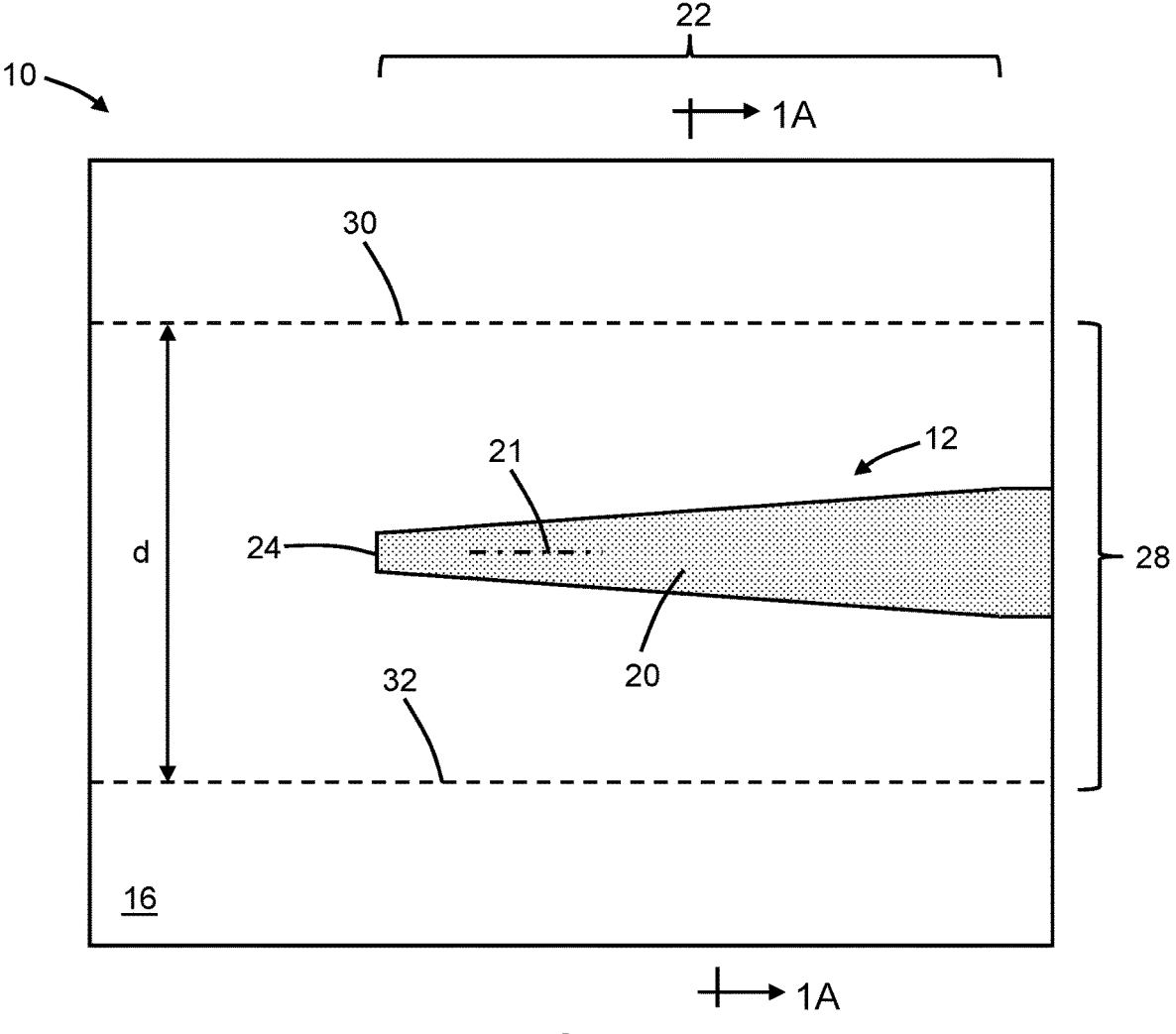
FIG. 1 is a top view of a structure at an initial fabrication stage of a processing method in accordance with embodiments of the invention.
Figure 1A:
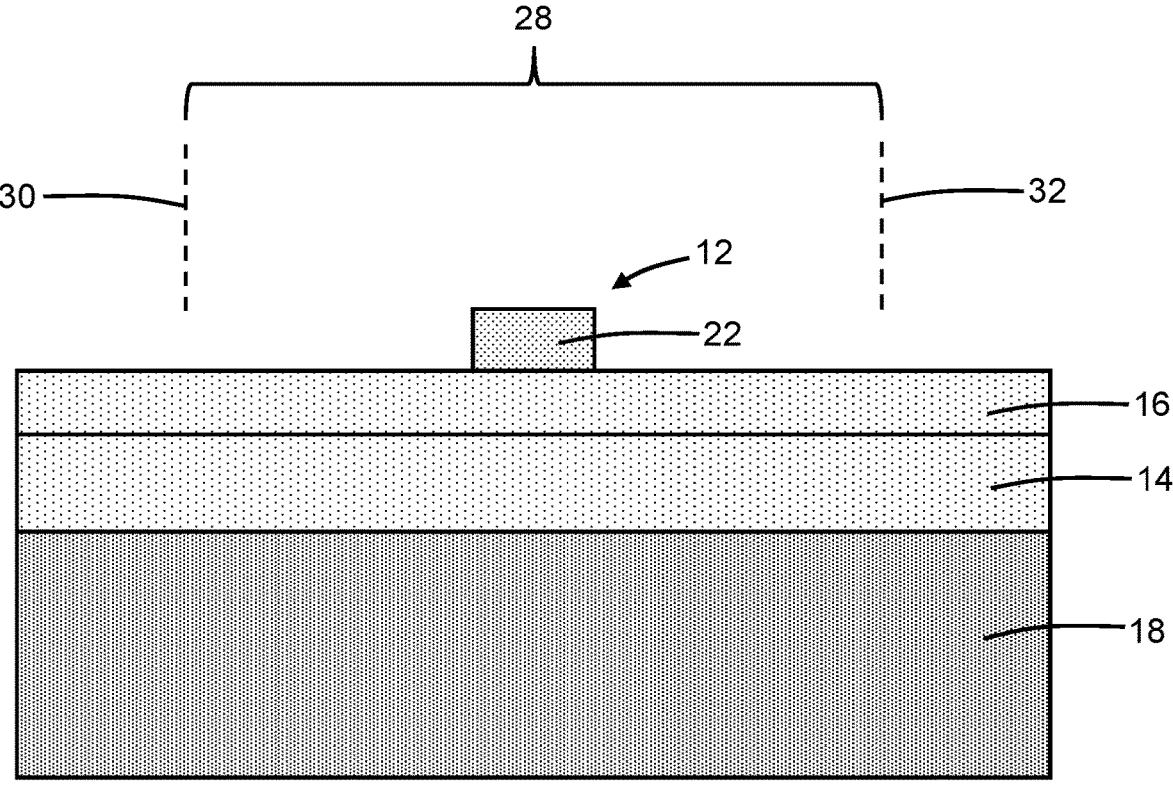
FIG. 1A is a cross-sectional view taken generally along line 1A-1A in FIG. 1.

With reference to FIGS. 1, 1A and in accordance with embodiments of the invention, a structure 10 for a photonic chip includes a waveguide core 12 that is positioned on, and over, a dielectric layer 14, a dielectric layer 16, and a semiconductor substrate 18. In an embodiment, the dielectric layers 14, 16 may be comprised of a dielectric material, such as silicon dioxide, and the semiconductor substrate 18 may be comprised of a semiconductor material, such as single-crystal silicon. The waveguide core 12 is separated from the semiconductor substrate 18 by the dielectric material of the intervening dielectric layers 14, 16, which operate as lower cladding. The waveguide core 12 may be disposed directly on the dielectric layer 16. In an alternative embodiment, the dielectric layer 16 may be omitted such that the waveguide core 12 is disposed directly on the dielectric layer 14.

In an embodiment, the waveguide core 12 may be comprised of a material having a refractive index that is greater than the refractive index of silicon dioxide. In an embodiment, the waveguide core 12 may be comprised of a dielectric material, such as silicon nitride, silicon oxynitride, or aluminum nitride. In an alternative embodiment, the waveguide core 12 may be comprised of a semiconductor material, such as single-crystal silicon, amorphous silicon, or polysilicon.

In an embodiment, the waveguide core 12 may be formed by patterning a layer with lithography and etching processes. In an embodiment, an etch mask may be formed by the lithography process over the layer to be patterned, and unmasked sections of the layer may be etched and removed by the etching process. The masked sections of the layer may determine the patterned shape of the waveguide core 12. In an embodiment, the waveguide core 12 may be formed by patterning a deposited layer comprised of its constituent material (e.g., silicon nitride). In an alternative embodiment, the waveguide core 12 may be formed by patterning the semiconductor material (e.g., single-crystal silicon) of the device layer of a silicon-on-insulator substrate in which the underlying dielectric layer 14 is a buried oxide layer and the dielectric layer 16 is omitted.

The waveguide core 12 may include a tapered section 20 that is capable of functioning as a spot-size converter 22. The tapered section 20 of the waveguide core 12 may be connected to a photonic integrated circuit of the photonic chip such that light can be transferred by the spot-size converter 22 from a light source, such as an optical fiber or a laser, to the photonic integrated circuit. The spot-size converter 22 defines an exemplary photonic device of the photonic chip.

The tapered section 20 of the spot-size converter 22, which is aligned along a longitudinal axis 21, terminates at a narrow end defining a facet 24. The tapered section 20 may be an inverse taper having a width dimension that increases with increasing distance from the facet 24. In an embodiment, the width dimension of the tapered section 20 may increase linearly with increasing distance from the facet 24. In an alternative embodiment, the width dimension of the tapered section 20 may vary based on a non-linear function, such as a quadratic function, a cubic function, a parabolic function, a sine function, a cosine function, a Bezier function, or an exponential function. In an embodiment, the tapered section 20 may include a single stage of tapering characterized by a taper angle. In an alternative embodiment, the tapered section 20 may taper in multiple stages each characterized by a different taper angle.

The tapered section 20 of the waveguide core 12 included in the spot-size converter 22 may be disposed inside or within the boundaries of a keep-out lane 28 in the layout of the photonic chip. The keep-out lane 28 may be defined as an area or zone on the surface of the dielectric layer 16 in which only the placement of the tapered section 20 of the spot-size converter 22 is allowed in the layout of the photonic chip. The tapered section 20 of the waveguide core 12 included in the spot-size converter 22 is laterally disposed between an outer edge 30 of the keep-out lane 28 and an outer edge 32 of the keep-out lane 28, which are disposed on opposite sides of the spot-size converter 22. The outer edge 30 may be laterally separated from the outer edge 32 by a distance d in a direction transverse to the longitudinal axis 21 of the tapered section 20 of the waveguide core 12 included in the spot-size converter 22. The distance d may be equal to, for example, about 21 micrometers. The longitudinal axis 21 of the tapered section 20 of the waveguide core 12 included in the spot-size converter 22 may be spaced from the outer edge 30 of the keep-out lane 28 by a spacing equal to a one-half of the distance d and may be spaced from the outer edge 32 of the keep-out lane 28 by a spacing equal to a one-half of the distance d. In an embodiment, the outer edges 30, 32 of the keep-out lane 28 may be aligned parallel to the longitudinal axis 21 of the tapered section 20 of the waveguide core 12 included in the spot-size converter 22.

In an alternative embodiment, the spot-size converter 22 may have a configuration that is different from a solid tapered section 20. For example, the tapered section 20 providing the spot-size converter 22 may be replaced by segments and a rib optionally overlaid on the segments. As another example, the spot-size converter 22 may include multiple waveguide cores that have a trident arrangement.

With reference to FIGS. 2, 2A, 2B, 2C in which like reference numerals refer to like features in FIGS. 1, 1A and at a subsequent fabrication stage, a dielectric layer 34 may be formed on, and over, the waveguide core 12 and the area surrounding the waveguide core 12, including the area encompassing keep-out lane 28. The dielectric layer 34 may be comprised of a dielectric material, such as silicon dioxide, having a refractive index that is less than the refractive index of the material constituting the waveguide core 12. The dielectric layer 34 may be surrounded on the photonic chip by a back-end-of-line stack, which may include a heterogenous stack of dielectric layers and metal fill disposed in one or more of the dielectric layers.

The keep-out lane 28 may be considered to project through the dielectric layers 14, 16 and may also be considered to project into the semiconductor substrate 18. The keep-out lane 28 may also be considered to project through the dielectric layer 34 to the top surface of the dielectric layer 34. The projection of the outer edge 30 and the projection of the outer edge 32 may define planes that bound the keep-out lane 28 and that are separated by the distance d. A purpose of the keep-out lane 28 is to define a region on the photonic chip in which the placement of features adjacent to the spot-size converter 22 is prohibited. The prohibition on feature placement in the layout is intended to limit interference with the functionality of the spot-size converter 22 during use. For example, the prohibition on feature placement may reduce the insertion loss of light from a light source into the spot-size converter 22.

Openings 36 may be formed as holes or perforations that extend over a height h through the dielectric layer 34 and the dielectric layers 14, 16 to the semiconductor substrate 18. In an embodiment, the openings 36 may terminate at the interface between the dielectric layer 14 and the semiconductor substrate 18. In an embodiment, the height h may be equal to the sum of the thicknesses of the dielectric layer 34 and the dielectric layers 14, 16. Each opening 36 includes an axis and a sidewall 37 that may be centered on the axis. In an embodiment, the openings 36 may be cylindrical, and the cross-sectional profile of the sidewall 37 in a plane transverse to the axis may have a round cross-sectional area and a circular outer boundary. In an embodiment, the openings 36 may have a critical dimension, which may be a diameter, that is greater than or equal to 10 micrometers. In an embodiment, the openings 36 may have a critical dimension, which may be a diameter, that is equal to about 10 micrometers. The openings 36 may be patterned by lithography and etching processes, which may include an anisotropic etching process.

Openings 38 may be formed as holes or perforations that extend over the height h through the dielectric layer 34 and the dielectric layers 14, 16 to the semiconductor substrate 18. In an embodiment, the openings 38 may terminate at the interface between the dielectric layer 14 and the semiconductor substrate 18. The openings 38 are disposed adjacent to the outer edge 30 of the keep-out lane 28. In an embodiment, the openings 38 may border the outer edge 30 of the keep-out lane 28. In an embodiment, the openings 38 may be arranged in a row along the outer edge 30. In an embodiment, the openings 38 may be arranged in the row with a uniform pitch to define a periodic arrangement. In an alternative embodiment, the openings 38 may be arranged in the row with a non-uniform pitch to define a nonperiodic arrangement. In an embodiment, the openings 38 may border the outer edge 30 of the keep-out lane 28 and may be arranged in a row along the outer edge 30.

Each opening 38 may be characterized by a D-shape having a closed sidewall that includes a sidewall portion 42 and a sidewall portion 44 adjoined to the sidewall portion 42. In an embodiment, the sidewall portion 42 of each opening 38 may be is curved and the sidewall portion 44 of each opening 38 may be uncurved. In an embodiment, the sidewall portion 44 of each opening 38 may be substantially planar. In an embodiment, the sidewall portion 42 and the sidewall portion 44 may adjoin along a pair of corners or edges extending along the height of each opening 38. In an embodiment, the sidewall portion 44 of each opening 38 may be the closest portion of the opening 38 to the spot-size converter 22. In an embodiment, the sidewall portion 44 of each opening 38 may be disposed closer to the spot-size converter 22 than the sidewall portion 42. In an embodiment, the sidewall portion 44 of each opening 38 may spatially coincide with the outer edge 30 of the keep-out lane 28. In an embodiment, the sidewall portion 44 of each opening 38 may be aligned parallel to the outer edge 30 of the keep-out lane 28. In an embodiment, the sidewall portion 44 of each opening 38 may spatially coincide with the outer edge 30 of the keep-out lane 28 and may be aligned parallel to the outer edge 30 of the keep-out lane 28. In an embodiment, the sidewall portion 44 of each opening 38 may border or lie on the outer edge 30 of the keep-out lane 28.

The closed sidewall of each D-shaped opening 38 may have an outer boundary provided by a disk segment projected along an axis 39 that extends over the height h of the opening 38 and a D-shaped cross-sectional profile in a plane transverse to the axis 39. The disk segment embodied in the cross-sectional profile of each D-shaped opening 38 is enclosed by a chord represented by the sidewall portion 44 and an arc represented by the sidewall portion 42. The sidewall portion 42 may be curved with a constant radius relative to the axis 39, and the D-shaped cross-sectional area enclosed by the sidewall portions 42, 44 is less than a round area characterized by the constant radius. In an embodiment, the disk segment embodied in the cross-sectional profile of each D-shaped opening 38 may be categorized as a major disk segment in which the arc length of the sidewall portion 42 is greater than half of the circumference of the sidewall portion 42 (i.e., an arc length greater than 180°). In an embodiment, the disk segment embodied in the cross-sectional profile of each D-shaped opening 38 may be categorized as a minor disk segment in which the arc length of the sidewall portion 42 is less than half of the circumference of the sidewall portion 42 (i.e., an arc length less than 180°). In an embodiment, the axes 39 of the openings 38 may be aligned in a row along the outer edge 30.

Openings 40 may be formed as holes or perforations that extend over the height h through the dielectric layer 34 and the dielectric layers 14, 16 to the semiconductor substrate 18. In an embodiment, the openings 40 may terminate at the interface between the dielectric layer 14 and the semiconductor substrate 18. The openings 40 are disposed adjacent to the outer edge 32 of the keep-out lane 28. In an embodiment, the openings 40 may border the outer edge 32 of the keep-out lane 28. In an embodiment, the openings 40 may be arranged in a row along the outer edge 32. In an embodiment, the openings 40 may be arranged in the row with a uniform pitch to define a periodic arrangement. In an alternative embodiment, the openings 40 may be arranged in the row with a non-uniform pitch to define a nonperiodic arrangement. In an embodiment, the openings 40 may border the outer edge 32 of the keep-out lane 28 and may be arranged in a row along the outer edge 32.

Each opening 40 may be characterized by a D-shape having a closed sidewall that includes a sidewall portion 46 and a sidewall portion 48 adjoined to the sidewall portion 46. In an embodiment, the sidewall portion 46 of each opening 40 may be is curved and the sidewall portion 48 of each opening 40 may be uncurved. In an embodiment, the sidewall portion 48 of each opening 40 may be substantially planar. In an embodiment, the sidewall portion 46 and the sidewall portion 48 may adjoin along a pair of corners or edges extending along the height of each opening 40. In an embodiment, the sidewall portion 48 of each opening 40 may be the closest portion of the opening 40 to the spot-size converter 22. In an embodiment, the sidewall portion 48 of each opening 38 may be disposed closer to the spot-size converter 22 than the sidewall portion 46. In an embodiment, the sidewall portion 48 of each opening 40 may spatially coincide with the outer edge 32 of the keep-out lane 28. In an embodiment, the sidewall portion 48 of each opening 40 may be aligned parallel to the outer edge 32 of the keep-out lane 28. In an embodiment, the sidewall portion 48 of each opening 40 may spatially coincide with the outer edge 32 of the keep-out lane 28 and may be aligned parallel to the outer edge 32 of the keep-out lane 28. In an embodiment, the sidewall portion 48 of each opening 40 may border or lie on the outer edge 32 of the keep-out lane 28.

The closed sidewall of each D-shaped opening 40 may have an outer boundary provided by a disk segment projected along an axis 41 that extends over the height h of the opening 40 and a D-shaped cross-sectional profile in a plane transverse to the axis 41. The disk segment embodied in the cross-sectional profile of each D-shaped opening 40 is enclosed by a chord represented by the sidewall portion 48 and an arc represented by the sidewall portion 46. The sidewall portion 46 may be curved with a constant radius relative to the axis 41, and the D-shaped cross-sectional area enclosed by the sidewall portions 46, 48 is less than a round area characterized by the constant radius. In an embodiment, the disk segment embodied in the cross-sectional profile of each D-shaped opening 40 may be categorized as a major disk segment in which the arc length of the sidewall portion 46 is greater than half of the circumference of the sidewall portion 46 (i.e., an arc length greater than 180°). In an embodiment, the disk segment embodied in the cross-sectional profile of each D-shaped opening 40 may be categorized as a minor disk segment in which the arc length of the sidewall portion 46 is less than half of the circumference of the sidewall portion 46 (i.e., an arc length less than 180°). In an embodiment, the axes 41 of the openings 40 may be aligned in a row along the outer edge 32.

In an embodiment, the sidewall portions 44 of the openings 40 may be opposite or across the keep-out lane 28 from the sidewall portions 48 of the openings 38 such that the sidewall portions 44 face the sidewall portions 48. In an embodiment, the openings 38 may be arranged in a row along the outer edge 30 of the keep-out lane 28, and the openings 40 may be arranged in a row along the outer edge 32 of the keep-out lane 28. In an embodiment, the openings 38 may be arranged in a row along the outer edge 30 of the keep-out lane 28, the openings 40 may be arranged in a row along the outer edge 32 of the keep-out lane 28, and the row including the openings 38 may be aligned parallel to the row including the openings 40.

The tapered section 20 of the waveguide core 12 included in the spot-size converter 22 is laterally disposed between the openings 38 and the openings 40. In an embodiment, the sidewall portions 44 of the openings 38 and the sidewall portions 48 of the openings 40 may represent the closest portions of the openings 38, 40 to the tapered section 20 of the waveguide core 12 included in the spot-size converter 22. The sidewall portions 44 of the openings 38 may be laterally spaced from the sidewall portions 48 of the openings 40 by a distance equal to the distance d between the outer edge 30 of the keep-out lane 28 and the outer edge 32 of the keep-out lane 28. In an embodiment, the sidewall portions 44 of the openings 38 may be spaced from the longitudinal axis 21 of the tapered section 20 of the waveguide core 12 included in the spot-size converter 22 by a spacing equal to a one-half of the distance d, and the sidewall portions 48 of the openings 40 may be spaced from the longitudinal axis 21 of the tapered section 20 of the waveguide core 12 included in the spot-size converter 22 by a spacing equal to a one-half of the distance d.

The openings 38, 40 may be patterned by lithography and etching processes. The lithography process may entail applying a layer of photoresist by a spin coating process, pre-baking, exposing the photoresist to light projected through a photomask, baking after exposure, and developing with a chemical developer to form respective openings in the layer of photoresist over the intended locations for the openings 38, 40. The etching process may be an anisotropic etching process, such as a reactive ion etching process, and the photoresist may be stripped by, for example, plasma ashing after forming the openings 38, 40. The shape of openings formed by the lithography process in the photoresist may be selected to establish a matching shape for the openings 38, 40. In an embodiment, the openings 38, 40 may have a critical dimension, which may be a diameter, that is greater than or equal to 10 micrometers. In an embodiment, the openings 38, 40 may have a critical dimension that is equal to about 10 micrometers. In an embodiment, the openings 36 may be patterned by the same lithography process and the same anisotropic etching process as the openings 38, 40.

Figure 2:
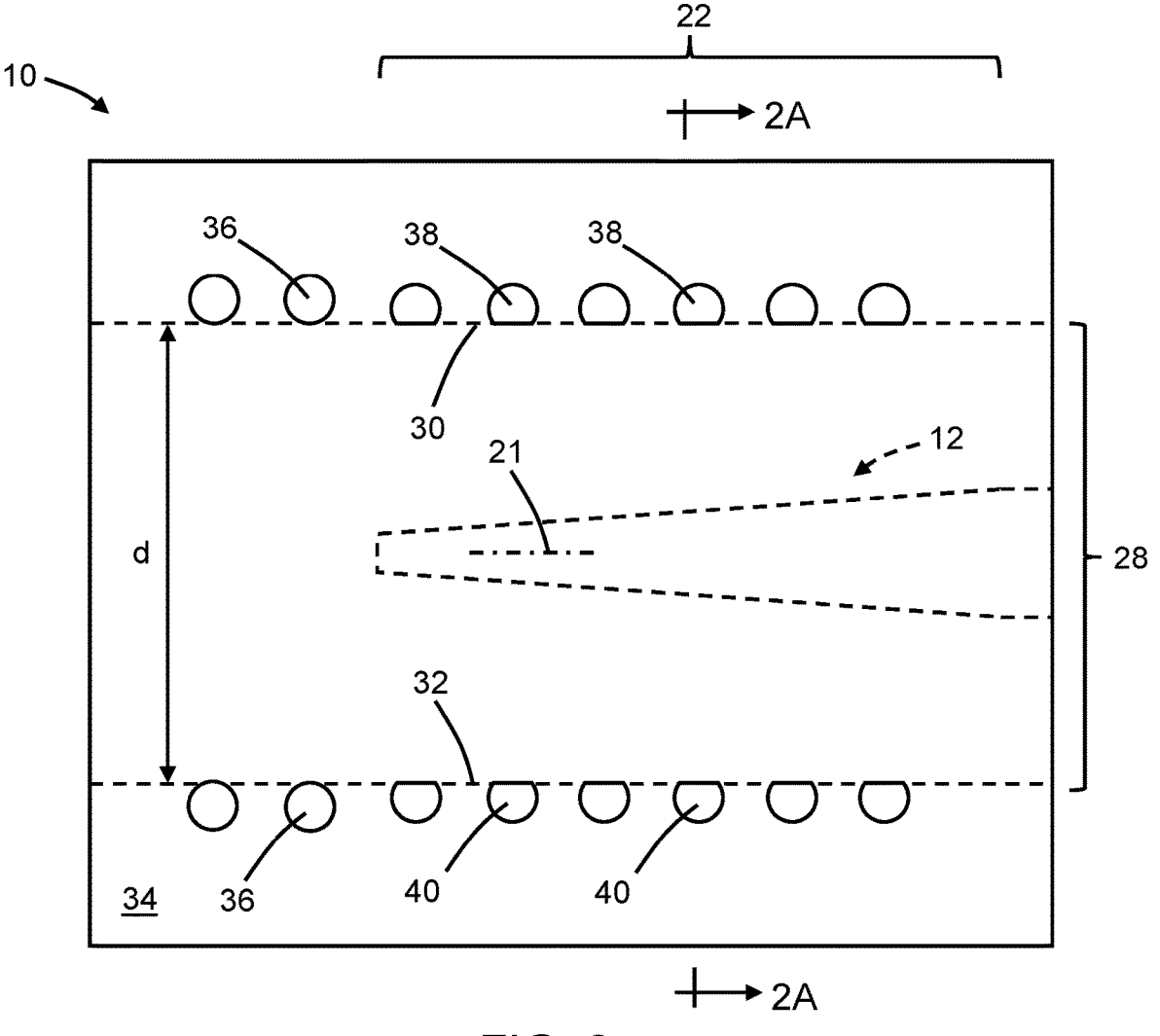
FIG. 2 is a top view of the structure at a fabrication stage of the processing method subsequent to FIG. 1.
Figure 2A:
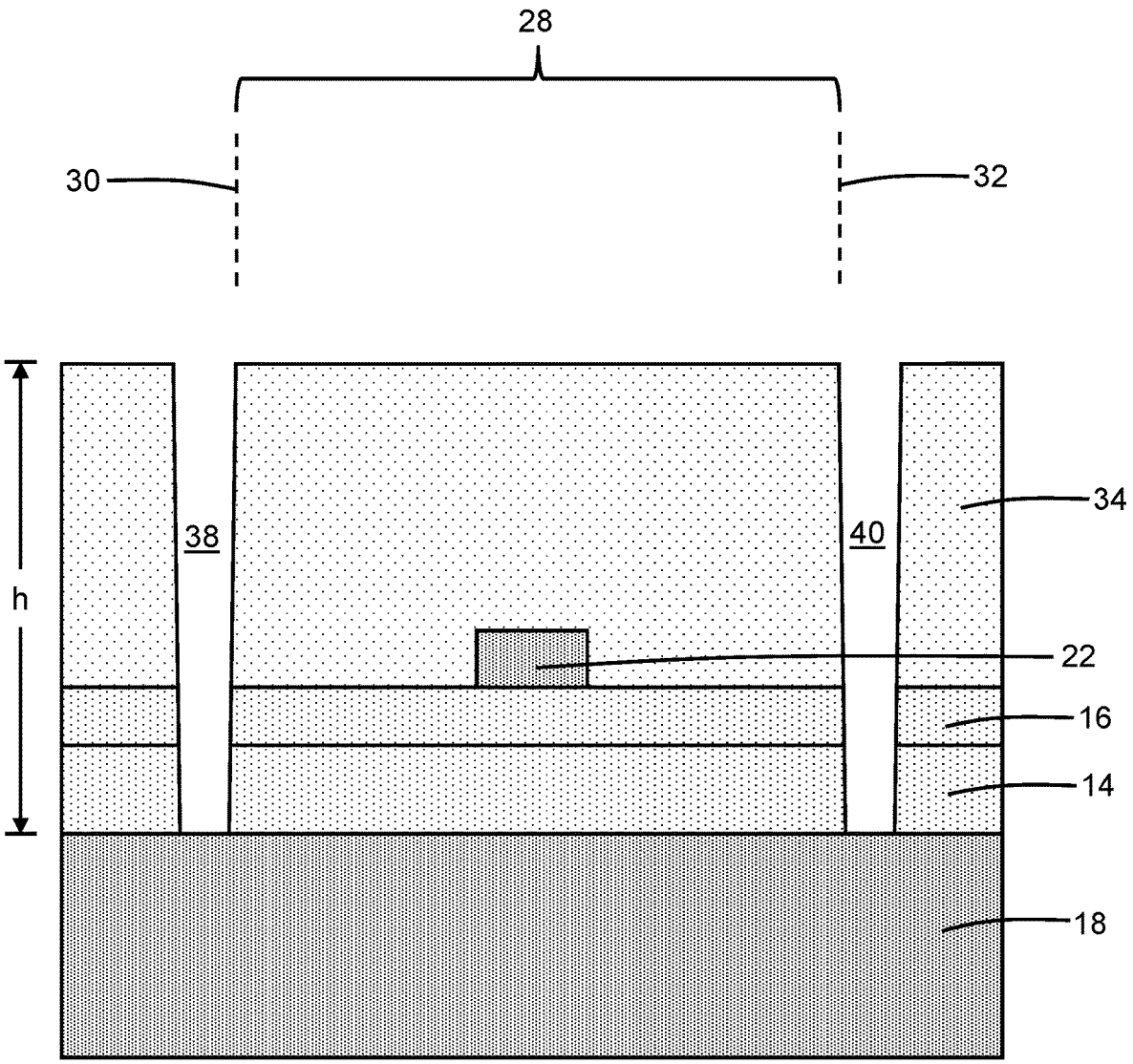
FIG. 2A is a cross-sectional view taken generally along line 2A-2A in FIG. 2.
Figure 2B:
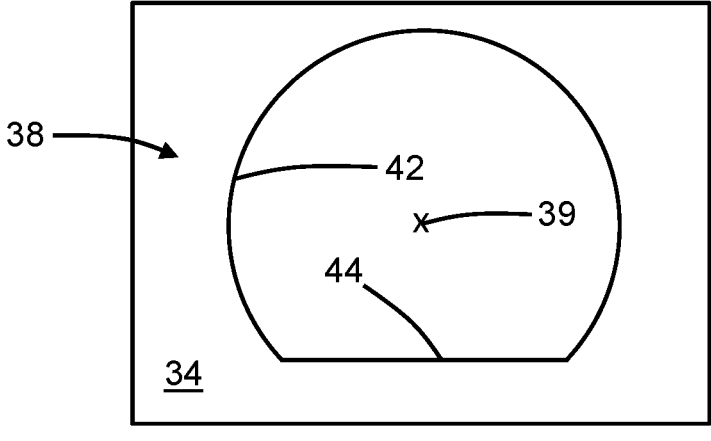
FIG. 2B is an enlarged top view of a portion of FIG. 2.
Figure 2C:
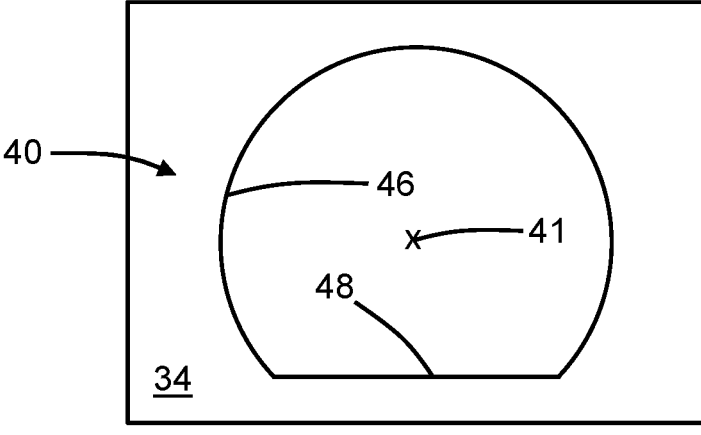
FIG. 2C is an enlarged top view of a portion in FIG. 2.
Figure 3:
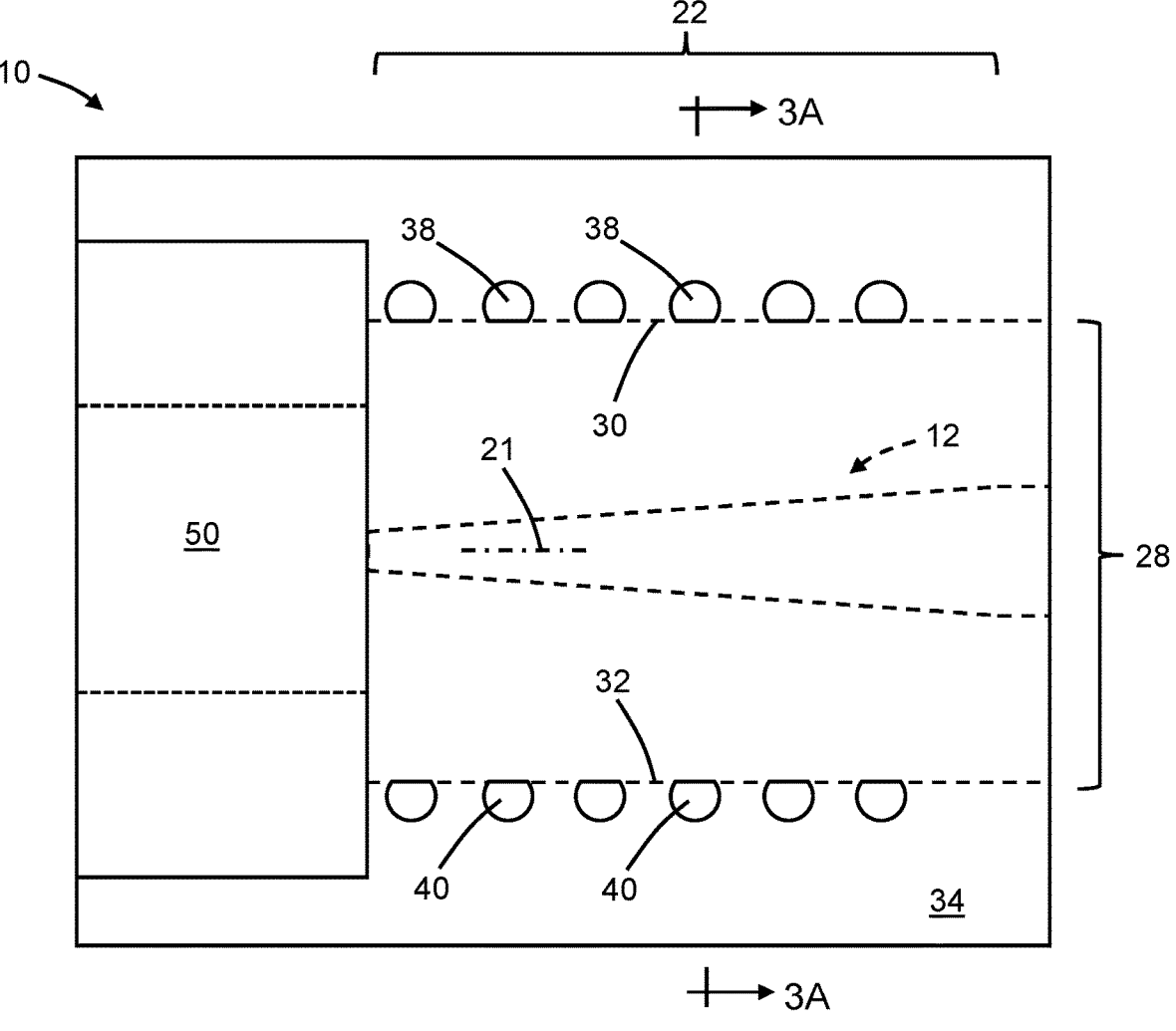
FIG. 3 is a top view of the structure at a fabrication stage of the processing method subsequent to FIGS. 2, 2A.
Figure 3A:
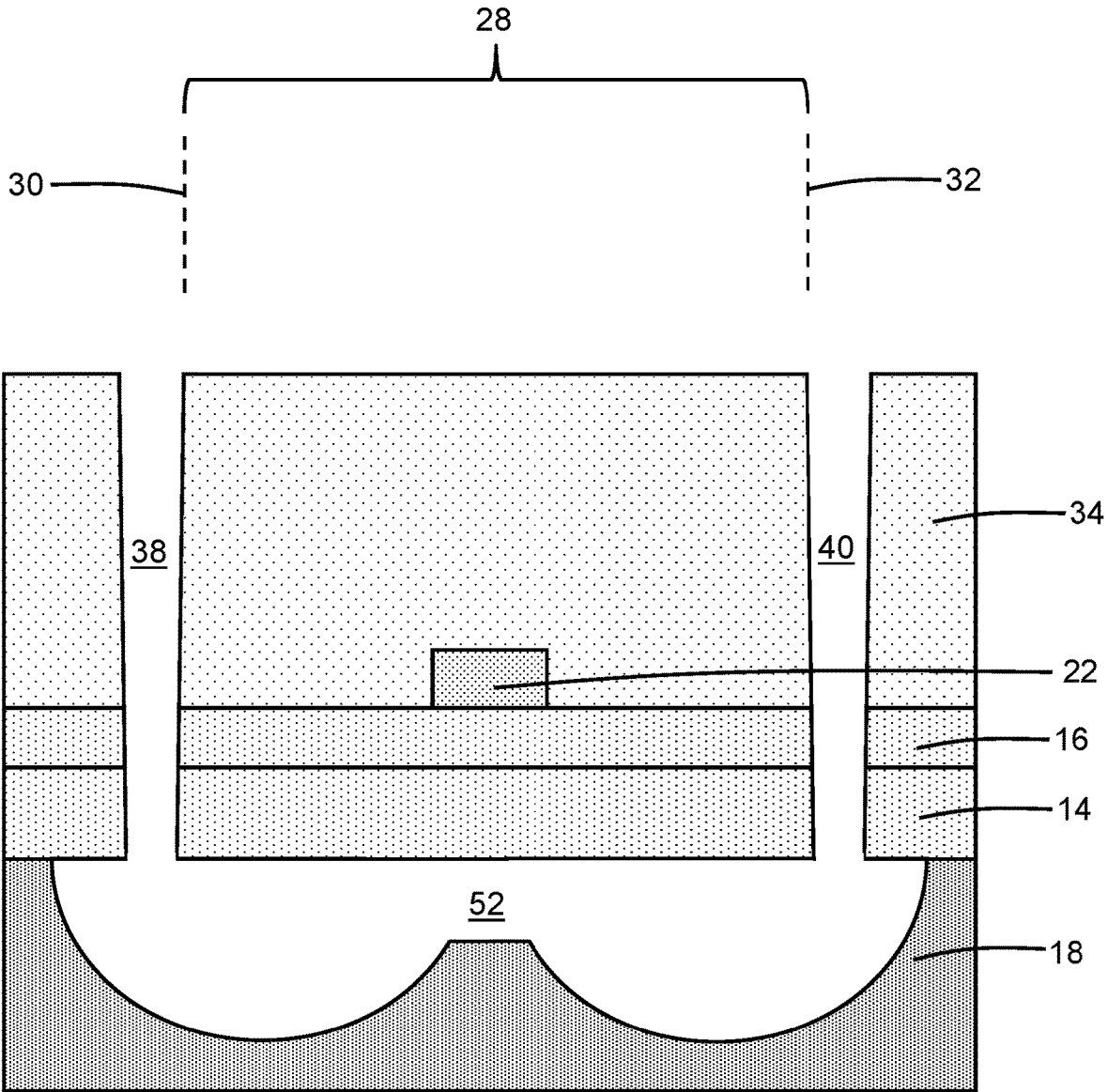
FIG. 3A is a cross-sectional view taken generally along line 3A-3A in FIG. 3.

With reference to FIGS. 3, 3A in which like reference numerals refer to like features in FIGS. 2, 2A and at a subsequent fabrication stage, a groove 50 may be formed in the semiconductor substrate 18 by an isotropic etching process using the openings 36 for passage of etchant, and an undercut 52 may be formed by an isotropic etching process using the openings 38, 40 for passage of etchant. The groove 50 is disposed adjacent to the facet 24 of the spot-size converter 22. The undercut 52 is disposed beneath the spot-size converter 22 with the dielectric layers 14, 16 providing a membrane separating the spot-size converter 22 from the undercut 52. The groove 50 and the undercut 52 may have a V-shape or U-shape produced by a wet chemical etchant having different etch rates along different crystalline directions of the semiconductor material of the semiconductor substrate 18. For example, the wet chemical etchant may be a solution containing tetramethylammonium hydroxide. An additional patterning operation may be performed to remove the dielectric layers 14, 16 and the dielectric layer 34 from over the groove 50, which also eliminates the openings 36. The groove 50 may receive all or a portion of a light source adjacent to the spot-size converter 22, and the undercut 52 may function to reduce mode leakage from the spot-size converter 22 to the semiconductor substrate 18.

The D-shape of the openings 38 and the D-shape of the openings 40 deviates from the conventional round openings to provide a larger vent open area during the etching processes without increasing the width dimension (i.e., the distance d) of the keep-out lane 28 and while minimizing the portions of the undercut 52 extending outside of the outside edges 30, 32. In the latter regard, the D-shape of the openings 38 and the D-shape of the openings 40 may prevent the outer boundaries of the undercut 52 from enlarging the overall footprint for the structure 10. The larger-than-conventional area for the openings 36, which is provided by the larger-than-conventional critical dimension for the openings 36, may expand the lithography process window and may function to improve the uniformity and yield of groove formation at the wafer level.

Figure 4:
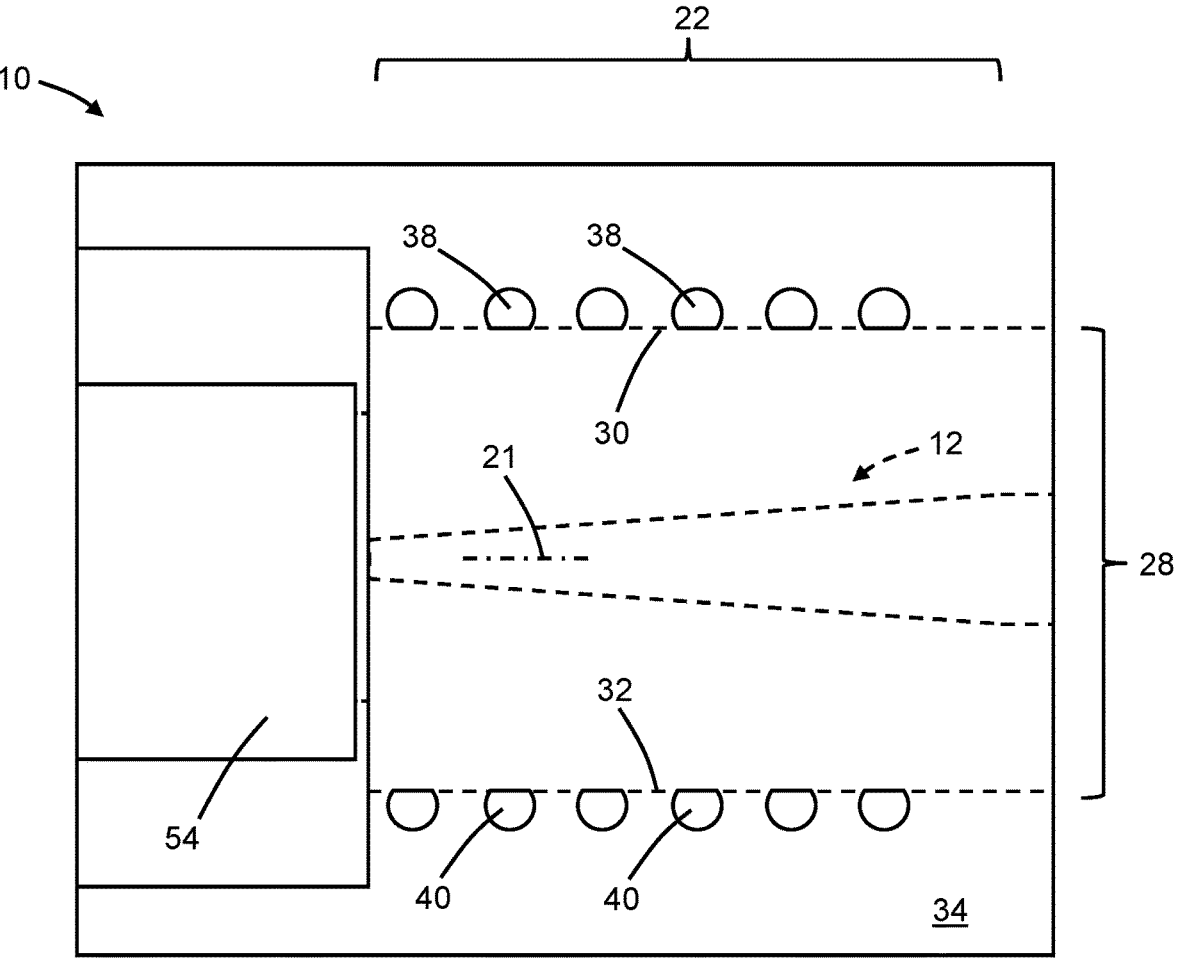
FIG. 4 is a top view of the structure at a fabrication stage of the processing method subsequent to FIGS. 3, 3A.

With reference to FIG. 4 in which like reference numerals refer to like features in FIG. 3 and at a subsequent fabrication stage, the tip of an optical fiber 54 may be disposed in the groove 50 adjacent to the facet 24 of the spot-size converter 22. The V-shape or U-shape of the groove 50 may self-align the tip of the optical fiber 54 with the facet 24 of the spot-size converter 22. The optical fiber 54 may be configured to provide light (e.g., laser light) in a mode propagation direction toward the spot-size converter 22. The light may be characterized by a given wavelength, intensity, mode shape, and mode size, and the spot-size converter 22 may provide mode conversion for the light that is guided to the photonic integrated circuit. The space between the spot-size converter 22 and the optical fiber 54 may be filled by air or, alternatively, may be filled by an index-matching material, such as an optical adhesive. In an alternative embodiment, the optical fiber 54 may be replaced as a light source by a semiconductor laser.

Figure 5:
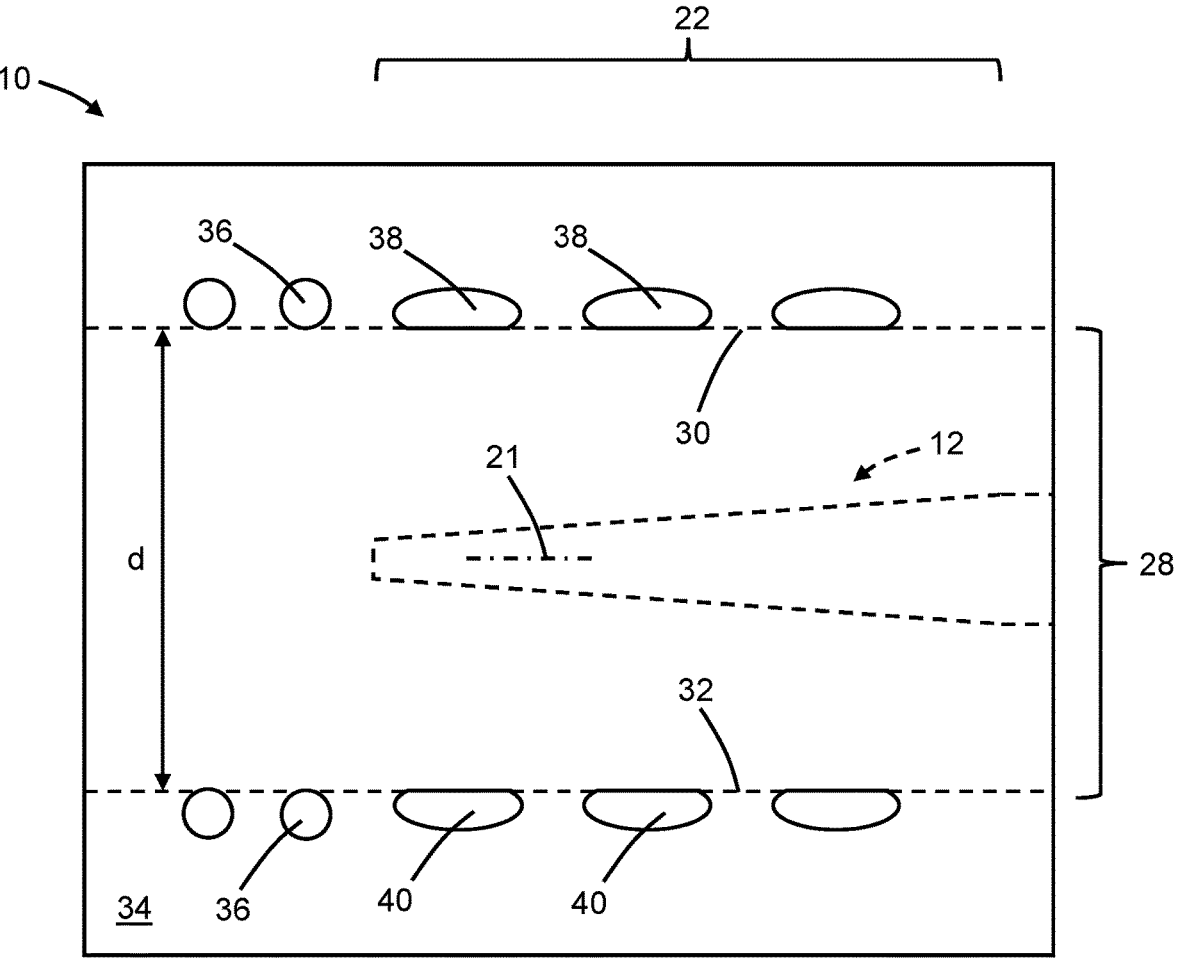
FIG. 5 is a top view of a structure in accordance with alternative embodiments of the invention.

With reference to FIG. 5 in which like reference numerals refer to like features in FIG. 2 and in accordance with alternative embodiments, the curved shape of the sidewall portion 42 of the openings 38 and the curved shape of the sidewall portion 46 of the openings 40 may be elliptical (i.e., oval or oblong) in the cross-sectional profile that the D-shapes are elongated to define elliptical segments instead of disk segments. The openings 38, 40 retain the D-shape even though the sidewall portions 42, 46 are not round. In an embodiment, the sidewall portion 42 of each opening 38 and the sidewall portion 46 of each opening 40 may have a major axis (i.e., length) that is aligned with the longitudinal axis 21 of the tapered section 20 of the waveguide core 12 included in the spot-size converter 22.

Figure 6:
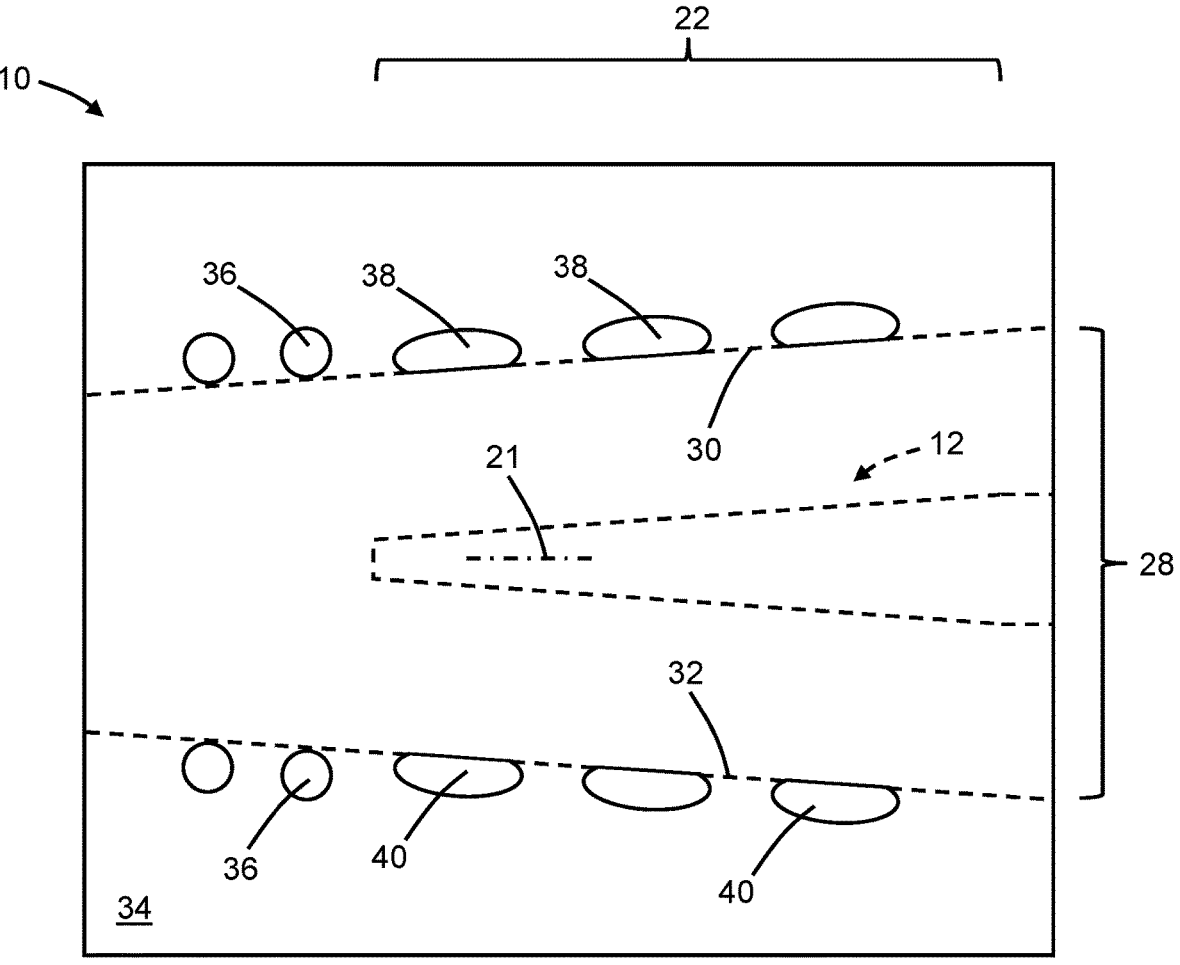
FIG. 6 is a top view of a structure in accordance with alternative embodiments of the invention.

With reference to FIG. 6 in which like reference numerals refer to like features in FIG. 2 and in accordance with alternative embodiments, the keep-out lane 28 may be tapered such that the distance d between the outer edges 30, 32 of the keep-out lane 28 varies with position along the longitudinal axis 21 of the tapered section 20 of the waveguide core 12 included in the spot-size converter 22. The row including the openings 38 may be tilted at an angle such that the sidewall portions 44 of the openings 38 spatially coincide with the angled outer edge 30 of the keep-out lane 28. The row including the openings 40 may be tilted at an angle such that the sidewall portions 48 of the openings 40 spatially coincide with the angled outer edge 32 of the keep-out lane 28.

Figure 7:
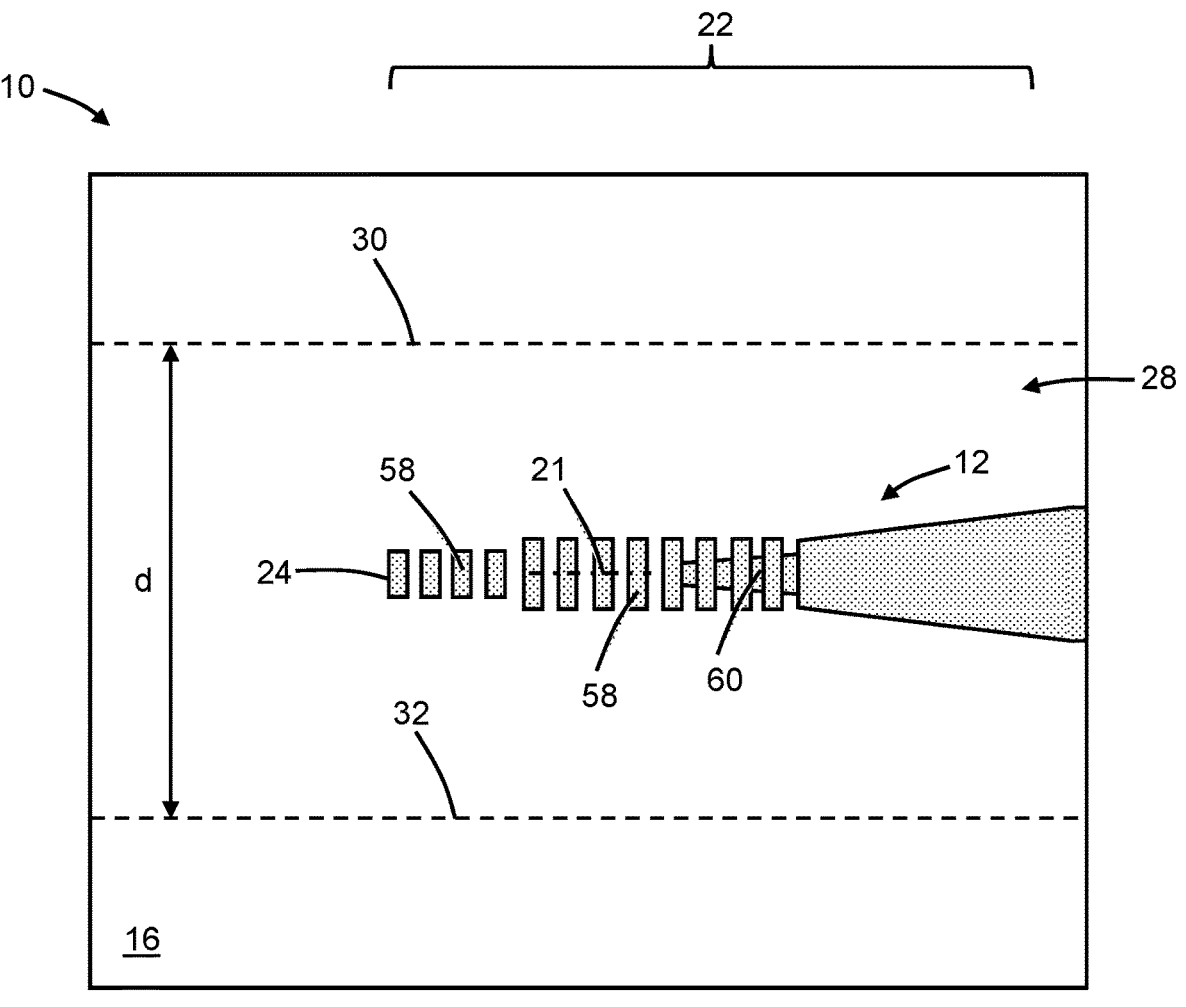
FIG. 7 is a top view of a structure in accordance with alternative embodiments of the invention.

With reference to FIG. 7 and in accordance with alternative embodiments, the spot-size converter 22 may be constructed to include segments 58 and a rib 60 that overlaps with some of the segments 58. The segments 58 and rib 60 of the spot-size converter 22 may be arranged along the longitudinal axis 21. Adjacent pairs of the segments 58 are separated by gaps having a given dimension in a direction parallel to the longitudinal axis 21. The segments 58 may be dimensioned and positioned at small enough pitch so as to define a sub-wavelength grating that does not radiate or reflect light at a wavelength of operation, such as a wavelength in a range of 400 nanometers to 3000 nanometers.

The gaps between segments 58 may be filled by portions of the dielectric material of the dielectric layer 34 to define a metamaterial structure in which the material constituting the segments 58 has a higher refractive index than the dielectric material. The metamaterial structure can be treated as a homogeneous material having an effective refractive index that is intermediate between the refractive index of the material constituting the segments 58 and the refractive index of the dielectric material.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may indicate a range of +/−10% of the specified value.

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a photonic device;
a semiconductor substrate; and
a dielectric layer disposed between the photonic device and the semiconductor substrate, the dielectric layer including a first plurality of D-shaped openings that are laterally offset from the photonic device, and each of the first plurality of D-shaped openings having a first sidewall portion that is curved and a second sidewall portion that is substantially planar.

2. The structure of claim 1 wherein the semiconductor substrate includes a cavity beneath the photonic device, and the first plurality of D-shaped openings intersect the cavity in the semiconductor substrate.

3. The structure of claim 1 wherein the dielectric layer includes a second plurality of D-shaped openings that are laterally offset from the photonic device, each of the second plurality of D-shaped openings has a first sidewall portion that is curved and a second sidewall portion that is substantially planar, and the photonic device is laterally disposed between the first plurality of D-shaped openings and the second plurality of D-shaped openings.

4. The structure of claim 3 wherein the semiconductor substrate includes a cavity beneath the photonic device, and the first plurality of D-shaped openings and the second plurality of D-shaped openings intersect the cavity in the semiconductor substrate.

5. The structure of claim 3 wherein the first plurality of D-shaped openings are arranged in a first row, and the second plurality of D-shaped openings are arranged in a second row.

6. The structure of claim 3 wherein the photonic device is disposed between a first outer edge of a keep-out lane and a second outer edge of a keep-out line, the second sidewall portion of each of the first plurality of D-shaped openings coincides with the first outer edge of the keep-out lane, and the second sidewall portion of each of the second plurality of D-shaped openings coincides with the second outer edge of the keep-out lane.

7. The structure of claim 1 wherein the semiconductor substrate includes a cavity beneath the photonic device, and the first plurality of D-shaped openings intersect the cavity in the semiconductor substrate.

8. The structure of claim 1 wherein the photonic device is a spot-size converter.

9. The structure of claim 1 wherein each of the first plurality of D-shaped openings has a cross-sectional profile that is a disk segment.

10. The structure of claim 9 wherein each of the first plurality of D-shaped openings has a height, the first sidewall portion of each of the first plurality of D-shaped openings is an arc of the disk segment projected over the height, and the second sidewall portion of each of the first plurality of D-shaped openings is a chord of the disk segment projected over the height.

11. The structure of claim 10 wherein the arc has an arc length that is greater than 180°.

12. The structure of claim 1 wherein each of the first plurality of D-shaped openings has a cross-sectional profile that is an elliptical segment.

13. The structure of claim 1 wherein the second sidewall portion of each of the first plurality of D-shaped openings is closer to the photonic device than the first sidewall portion.

14. The structure of claim 1 wherein the first plurality of D-shaped openings are arranged in a row.

15. The structure of claim 14 wherein the photonic device includes a waveguide core having a section with a longitudinal axis, and the row is aligned parallel to the longitudinal axis.

16. The structure of claim 15 wherein the second sidewall portion of each of the first plurality of D-shaped openings is spaced from the longitudinal axis of the section of the waveguide core.

17. The structure of claim 14 wherein the photonic device includes a waveguide core having a section with a longitudinal axis, and the row is tilted at an angle relative to the longitudinal axis.

18. A method comprising:

forming a photonic device, wherein a dielectric layer is disposed between the photonic device and a semiconductor substrate; and forming a first plurality of D-shaped openings in the dielectric layer that are laterally offset from the photonic device, wherein each of the first plurality of D-shaped openings has a first sidewall portion that is curved and a second sidewall portion that is substantially planar.

19. The method of claim 18 further comprising:

forming a second plurality of openings in the dielectric layer, wherein the second plurality of openings are round and have a diameter greater than or equal to 10 micrometers.

20. The method of claim 19 further comprising:

forming a groove in the semiconductor substrate at a location of the second plurality of openings.

\* \* \* \* \*